US012685271B2

(12) United States Patent
Rademakers

(10) Patent No.: US 12,685,271 B2
(45) Date of Patent: Jul. 21, 2026

(54) PROCESS AND APPARATUS FOR GROWING MYCELIUM SHEETS

(71) Applicant: MME HOUDSTERMAATSCHAPPIJ B.V., Ammerzoden (NL)

(72) Inventor: Gijsbertus Martinus Rademakers, Hedel (NL)

(73) Assignee: MME HOUDSTERMAATSCHAPPIJ B.V., Ammerzoden (NL)

( * ) Notice: Subject to any disclaimer, the term of this patent is extended or adjusted under 35 U.S.C. 154(b) by 0 days.

(21) Appl. No.: 18/569,806

(22) PCT Filed: Jun. 14, 2022

(86) PCT No.: PCT/NL2022/050330
§ 371 (c)(1),
(2) Date: Dec. 13, 2023

(87) PCT Pub. No.: WO2022/265498
PCT Pub. Date: Dec. 22, 2022

(65) Prior Publication Data
US 2024/0276929 A1 Aug. 22, 2024

(30) Foreign Application Priority Data

Jun. 14, 2021 (NL) ...................................... 2028443

(51) Int. Cl.
*A01G 18/62* (2018.01)
*A01G 18/20* (2018.01)
(Continued)

(52) U.S. Cl.
CPC ............. *A01G 18/62* (2018.02); *A01G 18/20* (2018.02); *A01G 18/69* (2018.02); *A01G 18/70* (2018.02)

(58) Field of Classification Search
CPC ........ A01G 18/00; A01G 18/20; A01G 18/62; A01G 18/69; A01G 18/70
See application file for complete search history.

(56) References Cited

U.S. PATENT DOCUMENTS 1,694,482 A * 12/1928 Morris ................... A01G 18/60
71/21
4,273,495 A * 6/1981 Pannell .................. A01G 18/20
141/125
(Continued)

FOREIGN PATENT DOCUMENTS

CN 109845576 A 6/2019
EP 2564687 A2 3/2013
(Continued)

OTHER PUBLICATIONS

International Search Report and Written Opinion in corresponding International Patent Application No. PCT/NL2022/050330 dated Sep. 13, 2022.
(Continued)

*Primary Examiner* — Monica L Perry
*Assistant Examiner* — Aaron M Rodziwicz
(74) *Attorney, Agent, or Firm* — Steven M. Koehler; Westman, Champlin & Koehler, P.A.

(57) ABSTRACT

Process for growing mycelium sheets. First, a substrate mixture is prepared in a mixer. Then the substrate mixture is applied as substrate layers on shelves of a rack in a cultivation room. The cultivation room is then closed and subsequently the substrate is pasteurized by injecting a pasteurizing medium, such as steam, into the closed cultivation room. In a next step, the substrate mixture is cooled and subsequently inoculated. During a growing step mycelium is
(Continued)

allowed to grow on the inoculated substrate mixture. In a next harvesting step, the mycelium is separated from the substrate.

18 Claims, 1 Drawing Sheet

(51) Int. Cl.
  *A01G 18/69*      (2018.01)
  *A01G 18/70*      (2018.01)

(56)          References Cited

U.S. PATENT DOCUMENTS

| | | | | |
|---|---|---|---|---|
| 4,443,969 A * | 4/1984 | Hanacek | A01G 18/00 | |
| | | | 47/1.1 | |
| 4,722,159 A * | 2/1988 | Watanabe | A01G 18/20 | |
| | | | 47/1.1 | |
| 4,833,820 A * | 5/1989 | Nishio | A01G 18/64 | |
| | | | 47/1.1 | |
| 6,018,906 A * | 2/2000 | Pia | A01G 18/62 | |
| | | | 47/1.1 | |
| 6,061,951 A * | 5/2000 | Pia | A01G 18/40 | |
| | | | 47/1.1 | |
| 8,069,608 B1 * | 12/2011 | Pannell | A01G 18/20 | |
| | | | 47/1.1 | |
| 8,869,691 B1 * | 10/2014 | Pannell | B30B 9/3021 | |
| | | | 100/219 | |
| 10,004,182 B1 * | 6/2018 | Pannell | A01G 18/20 | |
| 10,993,386 B1 * | 5/2021 | D'Amico | A01G 18/70 | |
| 2007/0101642 A1 * | 5/2007 | Fang | A01G 18/70 | |
| | | | 47/1.1 | |
| 2007/0111623 A1 * | 5/2007 | Heezen | A01G 18/00 | |
| | | | 442/181 | |
| 2009/0025286 A1 * | 1/2009 | Kawai | A01G 18/10 | |
| | | | 47/1.1 | |
| 2010/0139157 A1 * | 6/2010 | Kawai | A01G 18/00 | |
| | | | 47/1.1 | |
| 2011/0239533 A1 * | 10/2011 | Leone | A01G 18/20 | |
| | | | 47/1.1 | |
| 2017/0079213 A1 | 3/2017 | Ahmadi | | |
| 2020/0120880 A1 * | 4/2020 | Ross | A01G 18/10 | |
| 2020/0146224 A1 * | 5/2020 | Kaplan-Bie | C12M 23/00 | |
| 2022/0354068 A1 * | 11/2022 | Carlton | A23J 3/227 | |

FOREIGN PATENT DOCUMENTS

| | | |
|---|---|---|
| NL | 1035600 C2 | 7/2009 |
| NL | 2007321 C2 * | 3/2013 |
| SE | 1651575 A1 | 5/2018 |
| WO | 2020082043 A1 | 4/2020 |
| WO | 2020136448 A1 | 7/2020 |

OTHER PUBLICATIONS

Office Action in corresponding European patent application serial No. 22731338.4 dated Jan. 15, 2025.

* cited by examiner

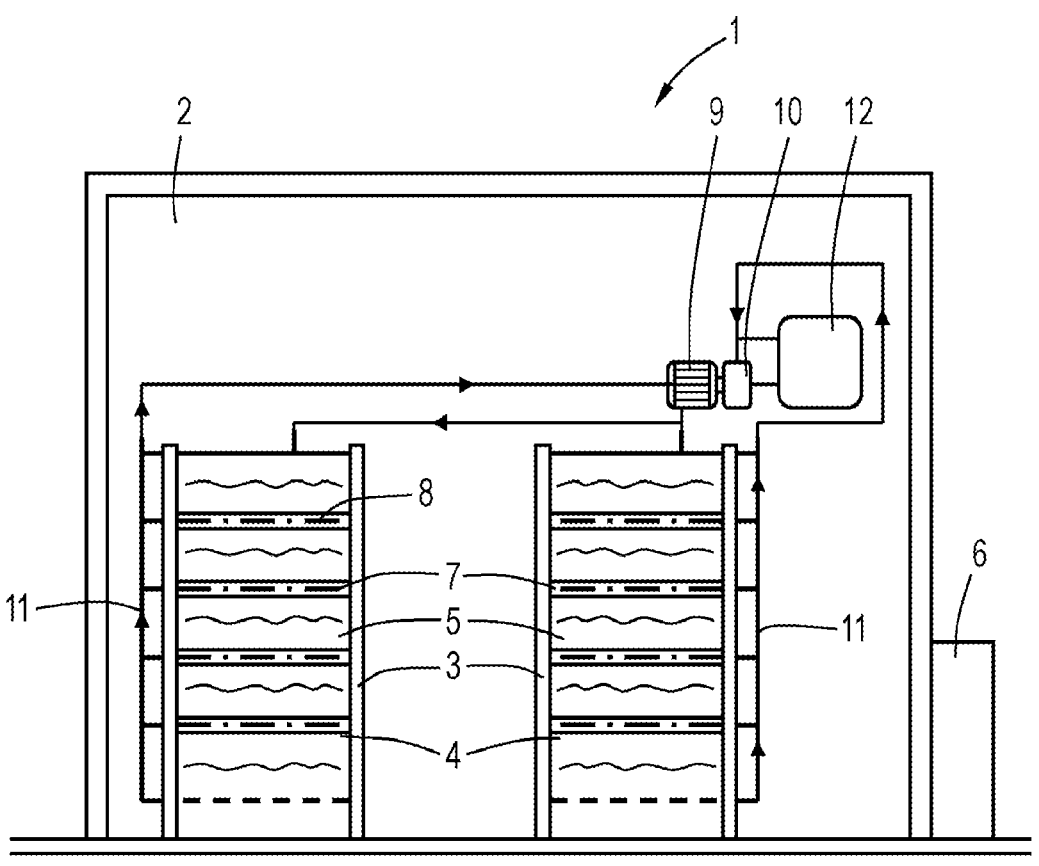

PROCESS AND APPARATUS FOR GROWING MYCELIUM SHEETS

CROSS-REFERENCE TO RELATED APPLICATION (S)

The present application is a § 371 national phase entry of International patent application Serial No. PCT/NL2022/050330, filed Jun. 14, 2022, and published in English, and claims priority from Netherlands application no. 2028443, filed on Jun. 14, 2021.

BACKGROUND

The present disclosure relates to a process for growing mycelium sheets, e.g., for use as an alternative for leather or textile, food products, such as mushrooms or meat, filters, or other applications.

In conventional food industry, mycelium is grown in a substrate which is gradually colonized by the mycelium to form mushrooms, which are the fruiting bodies of mycelium. To form mycelium sheets, the mycelium should mainly grow on top of the substrate rather than within the substrate, while the formation of fruiting bodies should be prevented.

To form mycelium sheets the mycelium is grown on pasteurized and inoculated substrate mixture in bags or boxes. WO 2020/082043 discloses a growing process using trays. This is a relatively elaborate process which is difficult to scale up.

SUMMARY

A process for growing mycelium sheets which is less elaborate and easier to scale up is provided.

The process comprises the following successive steps:
a substrate mixture is applied as substrate layers on shelves of a rack in a cultivation room;
in a next step, the cultivation room is closed and subsequently the substrate is pasteurized by injecting a pasteurizing medium, such as steam, into the closed cultivation room;
in a next step, the substrate mixture in the cultivation room is cooled and subsequently inoculated;
during a growing step mycelium is allowed to grow on the inoculated substrate mixture;
in a next harvesting step, the mycelium is separated from the substrate.

Since pasteurisation, inoculation and growth all take place within the cultivation room, the process can be carried out in a very economical and efficient manner. The process as a whole can be completed in a single cultivation room.

A cultivation room is an enclosed space with controllable growth conditions, including air temperature and air composition, and with racks for supporting substrate layers. Such cultivation rooms are known from growing edible mushrooms from the Agaricus bisporus fungal strain. Suitable examples of such cultivation rooms are the so-called Dutch shelf systems, conventionally used for growing edible mushrooms. Where cultivation rooms for edible mushrooms have at most 7 shelf layers of shelves, the cultivation rooms for mycelium sheets can have more layers, e.g., 8-12 shelf layers, since harvesting sheets requires less height between the shelves than picking mushrooms. The use of cultivation rooms enables to control environmental conditions during the growing step within the cultivation room so as to promote mycelium growth on top of the substrate without forming fruiting bodies.

Suitable fungal strains for growing mycelium sheets are for example Trametes Versicolor, Schizophyllum commune, Pleurotus ostreatus. Other suitable strains can also be used, if so desired. Particularly suitable are lignophile fungal strains growing in lignocellulosic substrate mixtures, such as saw dust.

The substrate may comprise any suitable mycelium food source such as potato dextrose, lignin, grains, wheats, minerals, cellulose and mixtures thereof. More particularly, the substrate may comprise wood particles, such as saw dust, e.g., oak and/or beech saw dust or a mix of hardwood and softwood particles, optionally supplemented with rye grains or nitrogen compounds such as millet.

The substrate mixture is applied on the shelves using a filling machine. Suitable filling machines include head filling machines used in the field of growing edible mushrooms. An example of such a filling machine is disclosed in U.S. Pat. No. 4,273,495. Such filling machines can apply beds with consistent bed thicknesses in relatively short time.

After applying the substrate layers on the shelves of the cultivation room, the cell is closed and subsequently the substrate is pasteurized by injecting a pasteurizing medium, such as steam, for example steam of at least 70° C. for about 12 hours. To this end, the cultivation room can be provided with one or more steam inlets connected or connectable to a source of steam.

The substrate mixture in the culture room is then cooled to a temperature allowing inoculation, typically in a temperature range between about 20° C. and about 30° C. In a next step, the substrate mixture of the substrate layers is inoculated. To this end, an inoculation device can be used which is movable along one or more of the beds of substrate mixture via a guide to distribute spawn, e.g., a liquid spawn or a grain spawn, over the substrate layers. The inoculation device can for example have a spawn container and one or more spraying nozzles for spraying liquid spawn from the spawn container. The spawn can be distributed over the substrate layers and, optionally, be mixed or stirred into the layers.

Optionally, a porous foil or membrane is placed on top of the inoculated substrate layers. Mycelium growing through the porous foil can easily be harvested by tearing off the porous foil with the mycelium from the substrate.

After inoculation, the mycelium is allowed to grow within the closed and climatized cultivation room, e.g., for a period of 7-10 days, e.g., about 9 days. Conditions in the cultivation room are controlled to promote mycelium growth on top of the substrate without producing fruiting bodies. This is essentially different from growing edible mushrooms, where mycelium colonizes the substrate and produces fruiting bodies. To promote mycelium growth on top of the substrate without producing fruiting bodies the conditions within the cultivation room are controlled to simulate summer conditions, rather than autumn conditions which promote the production of fruiting bodies. For instance, the $CO_2$ concentration in the cultivation room can be kept at a value of at least 3 vol. % on total air volume. The relative humidity can be kept at, e.g., at least 40%. The $O_2$ concentration can for example be kept below 20 vol. % on total air volume. The air temperature can be kept at about 20-about 35° C.

During colonization, the growing mycelium generates heat. Therefore, it is advantageous to control the temperature of the substrate material independently of the air temperature at least during the colonization step, e.g., by substrate heat exchange elements or plates on the shelves supporting the substrate layers. For instance, the substrate material can be cooled to at most about 5° C., or at most about 3° C. above the air temperature, e.g., to about 26-33° C., e.g., about 27-30° C. during colonization.

After the growing step, the cultivation room is opened and the mycelium sheets can be harvested. The mycelium sheets will typically have an average thickness of about 2-10 cm. The mycelium sheets can for example be harvested by cutting them from the substrate. If a porous foil was laid upon the substrate before growing the mycelium, the sheets can be harvested by tearing off the porous foil from the substrate. The used substrate mixture is removed from the shelves and can for example be reused as compost material in agriculture.

After harvesting the mycelium sheets can be dried and further processed, for example for use as an alternative for leather for furniture or fashion accessories, such as shoes or clothes, or for any other suitable application. Optionally, the harvested mycelium sheets can be laid on the heat exchange elements to promote drying of the sheets, e.g. at a temperature of up to about 35° C.

To control the temperature of the substrate material independently from the air temperature in the cultivation room, a cultivation room can be used comprising:

an interior space with shelves;

a closeable access port for access to the interior space;

and a control unit configured to maintain environmental conditions within the interior space, in particular air temperature, CO2 and/or O2 content and/or relative humidity of the air within the interior space such as to promote mycelium growth on top of the substrate without forming fruiting bodies.

Optionally, the shelves may form or support substrate heat exchange elements, the control unit being configured to control the heat exchange elements to heat or cool substrate material on the shelves independently from the air temperature, so as to promote mycelium growth on top of the substrate without forming fruiting bodies. Such substrate heat exchange elements can for example comprise channels connected to a source or closed circulation loop for a heat exchange fluid, such as water. These channels can for example run through the shelves, so the shelves form the heat exchange elements, and/or through plates on top of the shelves. The heat exchange elements can for example be plates, e.g., made of aluminium or of a plastic material. The plates can be placed on top of the shelves and/or the shelves themselves can be the heat exchange elements. A suitable example of a system with plate shaped heat exchange elements is disclosed in EP 2564687 A2.

Optionally, the circulation loop comprises a heat exchanger arranged for heat transfer between the heat exchange fluid in the circulation loop on the one hand and a second heat exchange fluid, such as water, in a second circuit for controlling the air temperature.

BRIEF DESCRIPTION OF THE DRAWINGS

Aspects of the invention are further explained with reference to the accompanying drawing in FIG. 1, schematically showing an exemplary embodiment.

DETAILED DESCRIPTION

FIG. 1 shows a cultivation room 1 confining an enclosed space 2 with two racks 3 supporting shelves 4 for supporting substrate layers 5. The cultivation room 1 comprises a control unit 6 outside the enclosed space 2 for controlling growth conditions within the enclosed space 2, including air temperature, O2 and CO2 content, and relative humidity.

The shelves 4 support flat, plate-shaped rectangular heat exchange elements 7 fully covering the shelves 4. Substrate material is applied on top of the plate-shaped heat exchange elements. The heat exchange elements 7 are provided with interior channels 8 for a heat exchange fluid, such as water. The channels 8 are connected to define a meandering flow path for the heat exchange fluid. The channels 8 are part of a closed circulation loop for circulating the heat exchange fluid.

The circulation loop also includes a heat exchanger 9 allowing heat transfer between the heat exchange fluid in the circulation loop on the one hand and a second heat exchange fluid—again in particular water—in a second circuit (not shown) for controlling the air temperature.

The control unit 6 is programmed to control the heat exchanger 9 to heat or cool the heat exchange fluid in the circulation loop. A pump 10 propels the heat exchange fluid to each shelve 4, through the meandering channels 8 of the plate-shaped heat exchange elements 5 of the shelve, and subsequently through a vertical return line 11 back to the heat exchanger 9. After the heat exchange fluid leaves the meandering channels 8 of the plate-shaped heat exchange elements 5 of a shelve 4, the temperature of the fluid is measured. The measured temperature is sent to the control unit 6. If the measured temperature is outside a pre-defined window around a set value, the control unit 6 controls the heat exchanger 9 to adjust the temperature of the fluid to the set value.

The circulated fluid cools or heats the substrate, which is heated by heat generated by mycelium growth during the colonization step. The substrate material may for example be cooled to a temperature of about 20-35° C., e.g., about 27-30° C., while the air temperature is kept at a temperature which is 0-5° C., e.g., 1-3° C. below the temperature of the substrate. This way, the temperature of the substrate material is controlled independently of the air temperature, so as to promote mycelium growth on top of the substrate without forming fruiting bodies.

The mycelium grows on top of the substrate to form sheets. After the sheets have a desired thickness, the mycelium sheets are harvested and the substrate material is removed from the heat exchange elements. The harvested mycelium sheets are then dried. To this end, they can be laid on the heat exchange elements 5 to bring the sheets to a drying temperature, e.g., up to about 35° C. to promote drying of the sheets.

The circulation loop also includes a pressure vessel 12 to maintain the required pressure in the usual manner.

The invention claimed is:

1. A process for growing mycelium sheets in a cultivation room with an access port of the cultivation room closed during a growing step to control environmental conditions within the cultivation room so as to promote mycelium growth on top of a substrate without forming fruiting bodies, the process comprising:

a substrate mixture is prepared in a mixer;

the substrate mixture is then applied as separate substrate layers on shelves, the shelves being vertically spaced apart on a rack with space between shelves to allow access to each substrate layer;

the rack is located in a cultivation room;

in a next step, the access port of the cultivation room is closed with the shelves on the rack in the cultivation room so as to isolate an interior of the cultivation room from an environment outside the cultivation room, and subsequently the substrate mixture is pasteurized by injecting a pasteurizing medium into the interior of the closed cultivation room;

in a next step following pasteurization, the substrate mixture of each substrate layer is cooled and subsequently each substrate layer on each shelf of the rack of shelves is inoculated;

during a growing step the cultivation room is closed and mycelium is allowed to grow on the inoculated substrate mixture in the cultivation room where environmental conditions in the interior of the closed cultivation room are adjusted to promote mycelium growth on tops of the substrate layers on the shelves of the rack without fruiting bodies; and in a next harvesting step, the mycelium is separated from the substrate mixture.

2. The process according to claim 1, wherein the CO2 concentration in the cultivation room during the growing step is at least 3 vol. % on total air volume, and the relative humidity is at least 40%, while the O2 concentration is below 20 vol. % on total air volume.

3. The process according to claim 1, wherein the substrate mixture is applied on the shelves using a head filling machine.

4. The process according to claim 1, wherein the pasteurizing medium is steam of at least 70° C.

5. The process according to claim 1, wherein the substrate mixture comprises lignocellulosic particulate material.

6. The process according to claim 5, wherein the lignocellulosic particulate material comprises saw dust.

7. The process according to claim 1, wherein the substrate mixture is inoculated using a distributor movable along one or more of the shelves of substrate mixture via a guide to distribute spawn over said bed of substrate mixture.

8. The process according to claim 7, wherein the spawn is a grain spawn or liquid spawn.

9. The process according to claim 1, wherein the mycelium is separated from the substrate before the cultivation room is emptied.

10. The process according to claim 1, wherein a porous foil is placed on top of the substrate layers before the growing step, and wherein during the harvesting step the porous foil is removed from the substrate together with the mycelium.

11. The process according to claim 1, wherein a temperature of the substrate mixture is controlled independently from an air temperature at least during the growing step.

12. The process according to claim 11, wherein during the growing step the temperature of the substrate mixture is maintained at about 26-30° C., while the air temperature is the cultivation room is maintained at 20-35° C.

13. The process according to claim 11, wherein the temperature of the substrate mixture is controlled by substrate heat exchangers formed by the shelves, or by heat exchange plates on top of the shelves supporting the substrate layers.

14. The process according to claim 1, wherein after the harvesting step the mycelium comprise sheets and the sheets are laid back on the shelves and heated.

15. The process according to claim 14, wherein the shelves comprise substrate heat exchangers, or heat exchange plates are provided on top of the shelves supporting the substrate layers.

16. A process for growing mycelium sheets in a cultivation room with an access port of the cultivation room closed during a growing step to control environmental conditions within the cultivation room so as to promote mycelium growth on top of a substrate without forming fruiting bodies, the process comprising:

a substrate mixture is applied as separate substrate layers on shelves, the shelves being vertically spaced apart on a rack with space between shelves to allow access to each substrate layer;

the rack is located in a cultivation room having walls defining closable interior space;

in a next step, the interior space is closed via the access so as to isolate the interior space of the cultivation room from an environment outside the cultivation room, and subsequently the substrate mixture is pasteurized on the shelves on the rack by injecting a pasteurizing medium into the closed interior space;

in a next step following pasteurization, the substrate mixture of each substrate layer is cooled and each substrate layer on each shelf of the rack of shelves is subsequently inoculated;

during a growing step with the cultivation room is closed environmental conditions are adjusted within the closed interior space so as to grow mycelium without fruiting bodies on the inoculated substrate mixture on the shelves on the rack in the closed interior space; and in a next harvesting step, the mycelium is separated from the substrate mixture.

17. The process according to claim 16, wherein the CO2 concentration in the cultivation room during the growing step is at least 3 vol. % on total air volume, and the relative humidity is at least 40%, while the O2 concentration is below 20 vol. % on total air volume.

18. The process according to claim 16, wherein the substrate mixture is applied on the shelves using a head filling machine.

* * * * *